US012613684B2

(12) United States Patent
Zhu et al.

(10) Patent No.: US 12,613,684 B2
(45) Date of Patent: Apr. 28, 2026

(54) DETECTION OF UNSTRUCTURED PARALLELISM BEHAVIOR OPERATIONS

(71) Applicant: Microsoft Technology Licensing, LLC, Redmond, WA (US)

(72) Inventors: Haishan Zhu, Bellevue, WA (US); Ian Bearman, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/330,359

(22) Filed: Jun. 6, 2023

(65) Prior Publication Data

US 2024/0411534 A1      Dec. 12, 2024

(51) Int. Cl.
*G06F 8/40* (2018.01)
*G06F 8/41* (2018.01)

(52) U.S. Cl.
CPC .............. *G06F 8/456* (2013.01); *G06F 8/434* (2013.01)

(58) Field of Classification Search
CPC ....................................................... G06F 8/456
See application file for complete search history.

(56) References Cited

U.S. PATENT DOCUMENTS

| | | | |
|---|---|---|---|
| 7,539,983 B2 | 5/2009 | Bearman et al. | |
| 7,631,304 B2 | 12/2009 | Bearman et al. | |
| 2010/0192004 A1 * | 7/2010 | Bauchot ................ | G06F 16/907 |
| | | | 709/202 |

| | | | |
|---|---|---|---|
| 2013/0055224 A1 | 2/2013 | Ravi | |
| 2014/0019949 A1 | 1/2014 | Craymer | |
| 2014/0372973 A1 * | 12/2014 | Urdang ................... | G06F 8/315 |
| | | | 717/108 |
| 2018/0373515 A1 | 12/2018 | Brown et al. | |
| 2019/0005421 A1 * | 1/2019 | Hammel .......... | G06Q 10/06393 |

(Continued)

OTHER PUBLICATIONS

"SIPT: Speculatively Indexed, Physically Tagged Caches", retrieved from << https://lph.ece.utexas.edu/merez/uploads/MattanErez/sipt_hpca18.pdf >>, Dec. 2, 2017, 14 pages.

(Continued)

*Primary Examiner* — Jae U Jeon
(74) *Attorney, Agent, or Firm* — Barta Jones, PLLC

(57)                    ABSTRACT

A tool analyzes source code of a program that targets a parallel processing system, and searches for parallelism unstructured behavior values that potentially inhibit parallelism efficiency. Example parallelism unstructured behavior values include particular memory addresses, memory masks, control divergences, and instruction predicates, which are identified according to their context and use in the program. The tool also locates program operations that contribute to these values, and determines a source of parallelism structure information in the program. In some scenarios, the tool populates a pattern data structure which is suitable to help guide code generation. Patterns detected include addressing patterns, mask patterns, and thread control patterns. Programs analyzed include single instruction multiple data programs and single instruction multiple thread programs. Code generation guided by the pattern data structure to optimize parallelism efficiency produces smaller and faster program code which consumes less on-chip memory.

20 Claims, 5 Drawing Sheets

(56)                References Cited

U.S. PATENT DOCUMENTS

2022/0292050 A1\*  9/2022  Bowen ................ G06F 15/7839
2023/0325076 A1\*  10/2023  Woo ...................... G06F 3/0664
                                                                711/154

OTHER PUBLICATIONS

"Dirigent: Enforcing QoS for Latency-Critical Tasks on Shared Multicore Systems", retrieved from << https://lph.ece.utexas.edu/merez/uploads/MattanErez/asplos2016_dirigent.pdf >>, Apr. 2, 2016, 15 pages.
"Tensor (machine learning)", retrieved from << https://en.wikipedia.org/wiki/Tensor_(machine_learning) >>, Apr. 11, 2023, 9 pages.
"Triton (programming language)", retrieved from << https://en.wikipedia.org/wiki/Triton_(programming_language) >>, Mar. 28, 2023, 1 page.
"CUDA", retrieved from << https://en.wikipedia.org/wiki/CUDA >>, Apr. 18, 2023, 24 pages.
"Parallel computing", retrieved from << https://en.wikipedia.org/wiki/Parallel_computing >>, Mar. 27, 2023, 21 pages.
"Code generation (compiler)", retrieved from << https://en.wikipedia.org/wiki/Code_generation_(compiler) >>, Apr. 15, 2022, 3 pages.
"Gather/scatter (vector addressing)", retrieved from << https://en.wikipedia.org/wiki/Gather/scatter_(vector_addressing) >>, Nov. 27, 2022, 3 pages.
"Single instruction, multiple data", retrieved from << https://en.wikipedia.org/wiki/Single_instruction,_multiple_data >>, Mar. 27, 2023, 10 pages.
"Single instruction, multiple threads", retrieved from << https://en.wikipedia.org/wiki/Single_instruction,_multiple_threads >>, Mar. 27, 2023, 3 pages.
"Predication (computer architecture)", retrieved from << https://en.wikipedia.org/wiki/Predication_(computer_architecture) >>, Mar. 19, 2023, 5 pages.
"Static program analysis", retrieved from << https://en.wikipedia.org/wiki/Static_program_analysis >>, Feb. 7, 2023, 6 pages.
"Compiler", retrieved from << https://en.wikipedia.org/wiki/Compiler >>, Apr. 13, 2023, 16 pages.
"Single program, multiple data", retrieved from << https://en.wikipedia.org/wiki/Single_program,_multiple_data >>, Mar. 27, 2023, 3 pages.

"Introduction to graphs and tf.function", retrieved from << https://www.tensorflow.org/guide/intro_to_graphs >>, Dec. 15, 2022, 18 pages.
Gustavo Enrique Rodriguez Villamizar, "A Graphical Representation of Exposed Parallelism", retrieved from << https://scholarsarchive.byu.edu/cgi/viewcontent.cgi?article=7467&context=etd >>, Jul. 1, 2017, 61 pages.
"PyTorch", retrieved from << https://en.wikipedia.org/wiki/PyTorch >>, Mar. 24, 2023, 5 pages.
"Pattern matching", retrieved from << https://en.wikipedia.org/wiki/Pattern_matching >>, Jan. 13, 2023, 8 pages.
Michael Andersch, et al., "NVIDIA Hopper Architecture In-Depth", retrieved from << https://developer.nvidia.com/blog/nvidia-hopper-architecture-in-depth/ >>, Mar. 22, 2022, 17 pages.
Jan Verschelde, "Memory Coalescing Techniques", retrieved from << http://homepages.math.uic.edu/~jan/mcs572/memory_coalescing.pdf >>, Mar. 31, 2023, 37 pages.
Charitha Saumya, et al., "DARM: Control-Flow Melding for SIMT Thread Divergence Reduction—Extended Version", retrieved from << https://arxiv.org/abs/2107.05681 >>, Jan. 14, 2022, 14 pages.
"How Computational Graphs are Constructed in PyTorch", retrieved from << https://pytorch.org/blog/computational-graphs-constructed-in-pytorch/ >>, Aug. 31, 2021, 9 pages.
Maurits Kaptein, "Creating ONNX from scratch", retrieved from << https://towardsdatascience.com/creating-onnx-from-scratch-4063eab80fcd >>, Feb. 5, 2021, 19 pages.
"XLA: Optimizing Compiler for Machine Learning", retrieved from << https://www.tensorflow.org/xla >>, no later than Apr. 26, 2023, 9 pages.
"Google JAX", retrieved from << https://en.wikipedia.org/wiki/Google_JAX >>, Apr. 3, 2023, 4 pages.
Jared Roesch, et al., "Relay: A New IR for Machine Learning Frameworks", retrieved from << https://arxiv.org/pdf/1810.00952.pdf >>, Sep. 26, 2018, 11 pages.
Mike Giles, "Lecture 3: control flow and synchronisation", retrieved from << https://people.maths.ox.ac.uk/gilesm/cuda/ecs/lec3-2x2.pdf >>, no later than Apr. 27, 2023, 9 pages.
International Search Report and Written Opinion received for PCT Application No. PCT/US2024/030670, Jul. 26, 2024, 14 pages.
Lain, et al., "Compiler and Run-time Support for Exploiting Regularity Within Irregular Applications," IEEE Transactions on parallel and distributed systems, vol. 11, Issue 2, Feb. 1, 2000, pp. 119-135.
International Preliminary Report on Patentability (Chapter I) received for PCT Application No. PCT/US2024/030670, mailed on Dec. 18, 2025, 09 pages.

\* cited by examiner

Figure 3:
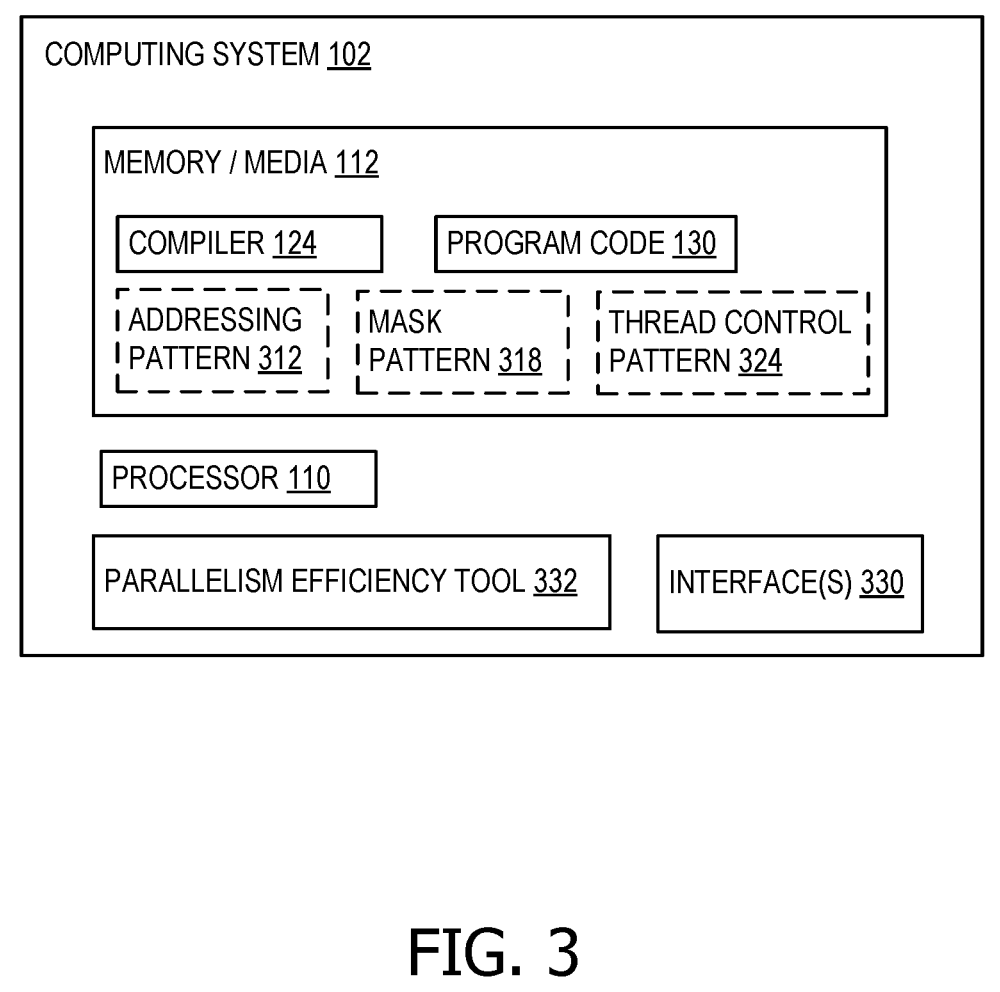

COMPUTING SYSTEM 102

MEMORY / MEDIA 112

COMPILER 124          PROGRAM CODE 130

ADDRESSING PATTERN 312          MASK PATTERN 318          THREAD CONTROL PATTERN 324

PROCESSOR 110

PARALLELISM EFFICIENCY TOOL 332          INTERFACE(S) 330

START

IDENTIFY PUBV IN PROGRAM CODE     402

LOCATE PUBV CONTRIBUTION OPERATION     404

DETERMINE PARALLELISM STRUCTURE INFORMATION SOURCE   406

POPULATE PATTERN DATA STRUCTURE     408

SUBMIT PATTERN DATA STRUCTURE     410

END

DETECTION OF UNSTRUCTURED PARALLELISM BEHAVIOR OPERATIONS

BACKGROUND

In parallel computing systems, multiple operations are performed at the same time, or at least overlap in time. As a result, computational results can be obtained more quickly than if the operations did not overlap. However, it is difficult to apply parallelism to all operations and data structures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples described herein identify a parallelism unstructured behavior value (PUBV) in a program code. The PUBV is associated with a risk of a runtime behavior which departs from a parallelism structure or otherwise reduces parallelism efficiency. A PUBV contribution operation which contributes to the PUBV is located, and a PUBV pattern data structure is populated based at least in part on the PUBV contribution operation. The populated PUBV pattern data structure is submitted to a code generator (e.g., of a compiler), which uses the populated PUBV pattern data structure to generate more efficient executable parallel computing code.

BRIEF DESCRIPTION OF THE DRAWINGS

The disclosed examples are described in detail below with reference to the accompanying drawing figures listed below:

FIG. 3 illustrates an exemplary computing system configured with parallelism efficiency functionality using a parallelism efficiency tool;

Corresponding reference characters indicate corresponding parts throughout the drawings. Any of the figures can be combined into a single example or embodiment.

DETAILED DESCRIPTION

Figure 1:
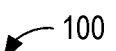
FIG. 1 illustrates an example architecture of a computing system that advantageously provides parallelism efficiency functionality.
Figure 1:
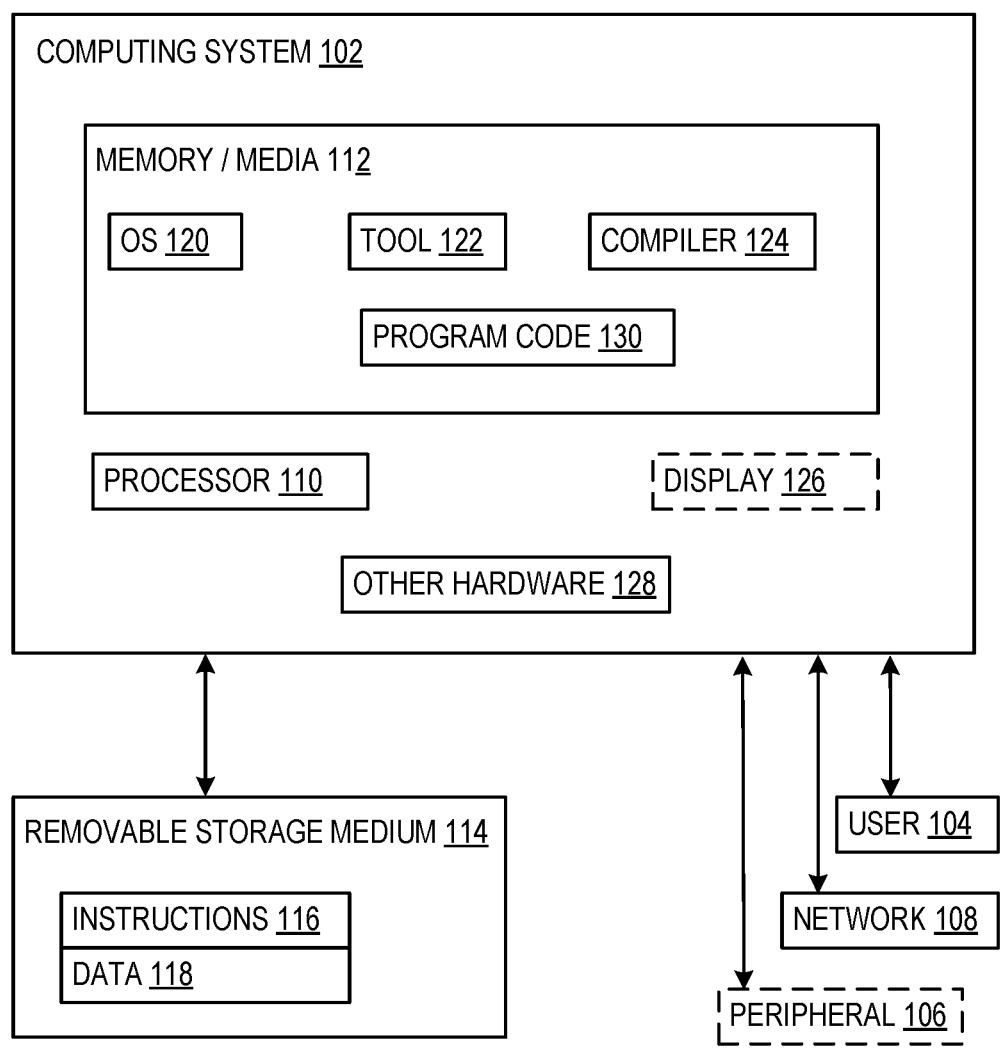

Some teachings described herein were motivated by technical challenges faced by innovators who were working to improve compiler technology for use with artificial intelligence (AI) programs. One motivation was to improve code generation for artificial intelligence single program multiple data (SPMD) software, but teachings herein also have wider applicability.

Innovators observed that structural information is lost when a high-level representation of an AI program is transformed into source code for SIMT, single instruction multiple data (SIMD), and/or single program multiple data (SPMD) software. For example, when mapping program operations depicted in a graph into source code that targets parallel processors to execute AI models, information on the structure of the operations and data layout can be lost. Such graphs, for example, may be a TensorFlow® graph, a PyTorch® graph, or an ONNX® graph (marks of Google LLC, The Linux Foundation, and LF Projects LLC, respectively). The disclosure reconstructs such information to reveal significant performance optimization opportunities during code generation.

The present disclosure describes compile-time approaches to restore such structure information from SIMT or SIMD programs. This structural information is extracted from the SIMT or SIMD programs, converted into a pattern data structure, and submitted to the code generator, thereby supporting increased processing efficiency in the execution of machine learning (ML) and other parallel computing software.

In some examples, the pattern data structure contains information indicating whether code accesses contiguous addresses, and whether there is a pattern in the addressing that can be leveraged for parallelism during code generation. Given such information, the code generator generates correct and efficient code that utilizes parallelism hardware. For example, the correct and efficient code instructs an AI accelerator to perform structured operations for data access. The pattern data structure allows the code generator to generate more efficient code for parallelism-based accelerators.

Some examples described herein utilize or provide an enhanced system which has a parallelism efficiency functionality, such as a functionality to detect unstructured parallelism behavior operations. Without the disclosure, the unstructured parallelism behavior operations are software operations which lead to missed code generation optimization opportunities. With the disclosure, a code generator is guided by a parallelism pattern data structure as taught herein to optimize parallelism during code generation.

Some examples include a compiler which is configured to identify, in a program code (e.g., by searching in the program code) a parallelism unstructured behavior value (PUBV). The PUBV is associated with a risk of a runtime behavior which departs from a parallelism structure. A PUBV contribution operation, which contributes to the PUBV, is located in the program code. A PUBV pattern data structure is created based at least in part on the PUBV contribution operation. A parallelism structure information source is determined based at least in part on the PUBV contribution operation, such as by searching in the program code. The PUBV pattern data structure is populated based at least in part on the parallelism structure information source. The populated PUBV pattern data structure is submitted to a code generator of the compiler. This functionality has the technical benefit of providing the code generator with parallelism structure information that allows the code generator to generate parallelism code that is more computationally efficient than code generated without using the parallelism structure information. Generating code with the benefit of the parallelism structure information results in shorter programs with fewer instructions, programs that consume less on-chip memory, and programs that do not need to rely on runtime hardware support to detect patterns in memory accesses or patterns in control behavior. This improves management of computational resources, and improves the functioning of the underlying device.

In some examples, the populated PUBV pattern data structure is submitted to a tool, such as a static analysis tool, that determines if a SIMT program with an unstructured behavior can be converted into a program with structured behavior. This is useful to inform the user, such as by feedback to a programmer, that the SIMT program will behave poorly when ported to a SIMD architecture. In these examples, the tool uses the populated PUBV pattern data structure to convert the SIMT program with unstructured behavior into a program with structured behavior.

In some examples, the populated PUBV pattern data structure represents an addressing pattern. An addressing pattern is a pattern of multiple addresses of a parallel processor's memory access. An addressing pattern is regular when memory addresses are regularly spaced at some constant increment, including zero increment. For example, the zero increment is supported by all threads in a warp that load data from the same address. In this scenario, the memory coalescing logic will collapse all requests into one and broadcast the result back to all threads. This has the technical benefit of allowing the code generator to generate a smaller number of memory access requests, thereby optimizing memory access efficiency and reducing executable program size for faster and more efficient program execution.

In some examples, the populated PUBV pattern data structure represents a mask pattern. A mask pattern is a per-element predicate to filter data loaded or data stored on a parallel processor. It is sometimes used to specify the dimensions of the data that is being loaded or stored. This has the technical benefit of allowing the code generator to generate a smaller number of masking instructions, thereby precisely expressing masking behavior and reducing executable program size for faster and more efficient program execution.

In some examples, the populated PUBV pattern data structure represents a thread control pattern. A thread control pattern is a pattern of control flow decisions made by concurrently scheduled threads. This has the technical benefit of allowing the code generator to group threads that follow the same branch at a control divergence, such as an IF statement or a case statement, thereby improving efficiency by executing the same instruction in parallel in multiple threads.

In some examples, the PUBV pattern data structure includes an offset and a stride. Offset and stride are aspects of addressing patterns, in that addressing patterns are sometimes described using offsets and strides. Offset specifies an initial address increment or decrement from a starting address and stride specifies an interval between addresses. A multi-dimensional addressing pattern is sometimes described by multiple offsets and strides, such as one pair for each dimension. This has the technical benefit of providing the code generator with parallelism structure information representing an addressing pattern, which in turn allows the code generator to generate a smaller number of memory access requests, thereby optimizing memory access efficiency and reducing executable program size for faster and more efficient program execution.

In some examples, the PUBV pattern data structure includes a start, an end, and a dimension. Start, end, and dimension are aspects of mask patterns, in that a mask pattern which specifies data dimensions of data being loaded or stored is sometimes described using start, end, and dimension. Start and end respectively represent a start value and an end value of a masking sequence, and dimension specifies the size of data being loaded or stored. This has the technical benefit of providing the code generator with parallelism structure information representing a multidimensional addressing pattern, which in turn allows the code generator to generate a smaller number of memory access requests, thereby overlapping access operations for faster program execution and reducing executable program size.

With reference to FIG. 1, an example operating environment 100 includes at least one computing system 102. The computing system 102 may be a multiprocessor computer system, or not. An operating environment 100 may include one or more machines in a given computer system, which may be clustered, client-server networked, and/or peer-to-peer networked within a cloud. An individual machine is a computer system, and a network or other group of cooperating machines is also a computer system. A given computing system 102 may be configured for end-users, e.g., with applications, for administrators, as a server, as a distributed processing node, and/or in other ways.

Human users 104 sometimes interact with a user interface associated with the computer system 102 by using display 126, peripherals 106 (e.g., keyboard, mouse etc.), via typed text, touch, voice, movement, computer vision, gestures, and/or other forms of I/O. Virtual reality or augmented reality or both functionalities are provided by a computing system 102 in some examples. The display 126 is a removable peripheral 106 in some examples and is an integral part of the computing system 102 in some other examples. The user interface supports interaction between the computing system 102 and the user 104. In some examples, the user interface includes one or more of: a command line interface, a graphical user interface (GUI), natural user interface (NUI), voice command interface, or other user interface (UI) presentations, presented as distinct options or integrated options.

System administrators, network administrators, cloud administrators, security analysts and other security personnel, operations personnel, developers, testers, engineers, auditors, and end-users are each a particular type of human user 104. In some examples, automated agents, scripts, play back software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some examples and part of a computing system 102 in other examples, depending on their detachability from the processor 110. In some examples, other computer systems not shown in FIG. 1 interact in technological ways with the computing system 102 or with another system using one or more connections to a cloud and/or other network via network interface equipment, for example.

Each computer system 102 includes at least one processor 110. The computer system 102, like other suitable systems, also includes one or more computer-readable storage media 112, also referred to as computer-readable storage devices 112. The computer-readable storage media 112 includes an operating system 120, a compiler 124 and a program code 130 which is analyzed for parallelism. In some examples, tools 122 include security tools or software applications, on computing system 102 (such as mobile devices, workstations, servers 102), editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some examples a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, EEPROMS, hard disks, and other memory storage devices which are not readily removable by user 104. Neither a computer-readable medium nor a computer-readable storage medium nor a computer-readable memory nor a computer-readable storage device is a signal per se or mere energy. In contrast, communication media typically embody computer readable instructions, data structures, program modules, or the like in a modulated data signal such as a carrier wave or other transport mechanism or signal per se, and include any information delivery media.

The configured storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some examples, a portion of the data 118 is representative of real-world items such as events manifested in the computing system 102 hardware, product characteristics, inventories, physical measurements, settings, images, readings, volumes, and so forth. Such data is also transformed by backup, restore, commits, aborts, reformatting, and/or other technical operations.

A general-purpose memory, which is removable or not, and is volatile or not, depending on the embodiment, can be configured in the embodiment using items such as program code 130, parallelism pattern data structures, abstract syntax trees, instruction predicates, memory addresses, memory masks, arrays, and vectors, in the form of data 118 and instructions 116, read from a removable storage medium 114 and/or another source such as a network connection, to form a configured storage medium 112. The configured storage medium 112 is capable of causing a computer system 102 to perform technical process steps for providing or utilizing parallelism efficiency functionality, as disclosed herein.

The Figures help illustrate configured storage media examples and process (e.g., method) examples, as well as system and process examples. In particular, any of the method steps illustrated in FIG. 4 or 5, or otherwise taught herein, may be used to help configure a storage medium to form a configured storage medium embodiment. Storage devices are examples of storage media, which exclude transitory signals per se.

Although an example is described as being implemented as software instructions executed by one or more processors in a computing device (e.g., general purpose computer, server, or cluster), such description is not meant to exhaust all possible examples. The same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some examples include one of more of: hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some examples, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and display 126, some operating environments also include other hardware 128, such as batteries, buses, power supplies, wired and wireless network interface cards, for instance. The nouns "screen" and "display" are used interchangeably herein. In some examples, a display 126 includes one or more touch screens, screens responsive to input from a pen or tablet, or screens which operate solely for output. In some examples, peripherals 106 such as human user I/O devices (screen, key board, mouse, tablet, microphone, speaker, motion sensor, etc.) will be present in operable communication with one or more processors 110 and memory 112.

In some examples, the system includes multiple computers connected by a wired and/or wireless network 108. Networking interface equipment can provide access to networks 108, using network components such as a packet-switched network interface card, a wireless transceiver, or a telephone network interface, for example, which are present in some computer systems. Network 108 generally includes, e.g., LANs, WANs, software-defined networks, clouds, and other wired or wireless networks. In some examples, virtualizations of networking interface equipment and other network components such as switches or routers or firewalls are also present, e.g., in a software-defined network or a sandboxed or other secure cloud computing environment. In some examples, one or more computers are partially or fully "air gapped" by reason of being disconnected or only intermittently connected to another networked device or remote cloud. In particular, parallelism efficiency functionality could be installed on an air gapped network and then be updated periodically or on occasion using removable media 114, or not updated at all. Some examples also communicate technical data or technical instructions or both through direct memory access, removable or non-removable volatile or nonvolatile storage media, or other information storage-retrieval and/or transmission approaches.

Figure 2:
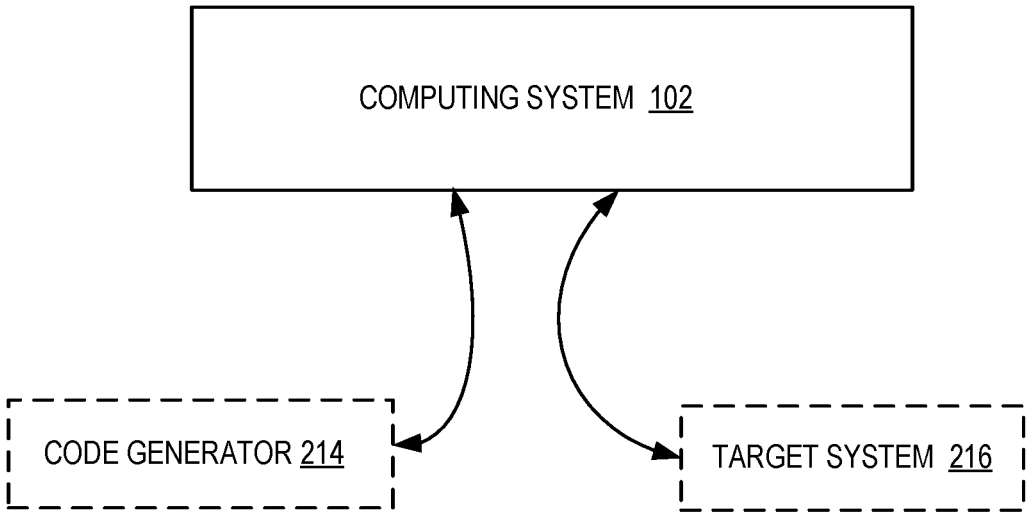
FIG. 2 illustrates an exemplary computing system configured with parallelism efficiency functionality in a compiler example.

FIG. 2 illustrates a computing system 102 configured by one or more of the parallelism efficiency enhancements taught herein, resulting in an enhanced system. In some examples, this enhanced system includes a single machine, a local network of machines, machines in a particular building, machines used by a particular entity, machines in a particular datacenter, machines in a particular cloud, or another computing environment such as environment 100 that is suitably enhanced.

In particular and without excluding other examples taught herein, a FIG. 2 set of examples illustrated by FIG. 2 includes an enhanced computing system 102 configured with functionality to detect unstructured parallelism operations, and in particular to identify a PUBV.

A SIMD subset of this FIG. 2 set of examples includes a SIMD computing system, and SIMT subset of this FIG. 2 set of examples includes a SIMT computing system. Some examples include both SIMD and SIMT hardware.

A memory address PUBV subset of this FIG. 2 set of examples includes functionality to identify unstructured parallelism memory address operations, a memory mask PUBV subset of this FIG. 2 set of examples includes functionality to identify unstructured parallelism memory mask operations, a control divergence PUBV subset of this FIG. 2 set of examples includes functionality to identify unstructured parallelism control divergence operations, and an instruction predicate PUBV subset of this FIG. 2 set of examples includes functionality to identify unstructured parallelism instruction predicate operations. Some examples include functionality to identify two of these PUBVs: memory address and memory mask, or memory address and control divergence, or memory address and instruction predicate, or memory mask and control divergence, or memory mask and instruction predicate, or control divergence and instruction predicate. Some examples include functionality to identify three of these PUBVs; omitting only the memory address PUBV, omitting only the memory mask PUBV, omitting only the control divergence PUBV, or omitting only the instruction predicate PUBV. Some examples include functionality to identify all four of these PUBVs.

A code generator variation example of any embodiment in the FIG. 2 set of examples includes a code generator 214. A target system variation example of any embodiment in the FIG. 2 set of examples further includes a target system 216. Some examples include both a code generator 214 and a target system 216. The code generator 214 is often but not necessarily integrated with a compiler embodiment, e.g., as an integrated pass or module of the compiler embodiment and the target system 216 is a computing system on which generated code is being executed or will be executed. In the context of parallelism, the target system 216 generally has parallel processors or other parallel processing capability.

FIG. 3 shows an exemplary enhanced computing system 102. In particular and without excluding other examples taught herein, a FIG. 3 set of examples illustrated by FIG. 3 includes a computing system 102 configured with an enhanced compiler 124 embodying functionality to detect unstructured parallelism operations, and in particular to populate a pattern data structure.

Compiler 124 discussed herein may provide different functionality. For example, different compilers 124 have different respective functionality to identify different kinds of PUBVs, have different respective functionality to populate different kinds of pattern data structures, and respectively submit information to an integrated code generator or to an external code generator, such as the code generator 214 shown in FIG. 2. Any reference herein to "a compiler" or "an enhanced compiler" or "the compiler" or "the enhanced compiler" means "an example" of the referenced compiler.

An addressing pattern subset of this FIG. 3 set of examples includes a compiler configured to populate an addressing pattern 312 data structure, a mask pattern subset of this FIG. 3 set of examples includes a compiler configured to populate a mask pattern 318 data structure, and a thread control pattern subset of this FIG. 3 set of examples includes a compiler configured to populate a thread control pattern 324 data structure. Some examples include a compiler configured to populate two of these pattern data structures, and some examples include a compiler configured to populate all three of these pattern data structures.

A parallelism efficiency tool variation example of any embodiment in the FIG. 3 set of examples further includes a parallelism efficiency tool 332. In some examples, the enhanced computing system 102 is networked through an interface 330. For example, the interface 330 includes hardware such as network interface cards, software such as network stacks, APIs, or sockets, combination items such as network connections, or a combination thereof.

In some examples, the computing system 102 is configured to produce efficient parallelism executable code. The computing system 102 includes: a digital memory 112; a processor 110, the processor in operable communication with the digital memory; and a compiler 124. Upon execution by the processor, the compiler 124 identifies in a program code 130 a parallelism unstructured behavior value (PUBV). The PUBV is associated with a risk of a runtime behavior which departs from a parallelism structure. The compiler 124 locates, in the program code, a PUBV contribution operation which contributes to the PUBV. The compiler 124 creates a PUBV pattern data structure based at least in part on the PUBV contribution operation. The compiler 124 determines a parallelism structure information source based at least in part on the PUBV contribution operation. The compiler 124 populates the PUBV pattern data structure based at least in part on the parallelism structure information source. The compiler 124 submits the populated PUBV pattern data structure to a code generator 214 of the compiler 124.

In some examples, the computing system 102 includes: a digital memory 112; a processor 110, the processor in operable communication with the digital memory; and a parallelism efficiency tool 332. The parallelism efficiency tool 332 is configured to, upon execution by the processor set, search a program code for a parallelism unstructured behavior value (PUBV) which is associated with a risk of a runtime behavior which departs from a parallelism structure. Upon identifying the PUBV, the parallelism efficiency tool 332 is configured to search in the program code for a PUBV contribution operation which contributes to the PUBV. Upon locating the PUBV contribution operation, the parallelism efficiency tool 332 is configured to create a PUBV pattern data structure based at least in part on the PUBV contribution operation. The parallelism efficiency tool 332 is configured to search in the program code for a parallelism structure information source based at least in part on the PUBV contribution operation. Upon determining the parallelism structure information source, the parallelism efficiency tool 332 is configured to populate the PUBV pattern data structure based at least in part on the parallelism structure information source. The parallelism efficiency tool 332 is further either configured to submit the populated PUBV pattern data structure example to a code generator, or configured to report a search result of searching for at least one of the PUBV, the PUBV contribution operation, or the parallelism structure information source, or configured both to submit the populated PUBV pattern data structure to the code generator and to report the search result.

The fact that an example is configured to perform an operation does not mean the operation is necessarily performed every time the example executes, but rather means that the software to perform the operation is present in the example and which portions of the software execute in a given scenario varies. In a Scenario A, a search result indicates that no PUBV was identified. Then the searches for the PUBV contribution operation and parallelism structure information source are skipped, and the result indicating no PUBV found is reported. In a Scenario B, a PUBV is identified, but no PUBV contribution operation is located. The search for the parallelism structure information source is skipped, and the result indicating the PUBV but no location of a contribution operation is reported.

More generally, in some examples, a parallelism efficiency tool 332 analyzes unstructured code for a purpose beyond compilation, or a purpose other than compilation. For instance, the parallelism efficiency tool 332 is used in a Scenario C to determine whether a SIMT program with an unstructured behavior can be converted into a program with structured behavior. This result is useful to inform a user that their SIMT program will behave poorly when ported to a SIMD architecture. In some scenarios, the parallelism efficiency tool 332 runs separately from compilation, as a separate static analysis tool. In some scenarios, an output of the parallelism efficiency analysis, such as the populated PUBV pattern data structure, is used for code generation or for programmer feedback to a static analysis tool. In other scenarios, the parallelism efficiency tool analysis is integrated into a compilation.

In some examples, the program code 130 includes program code of a SIMT program, and the parallelism unstructured behavior value includes at least one of: a memory address, a memory mask, or a control divergence. In some examples, the program code 130 includes program code of a SIMD program, and the parallelism unstructured behavior value includes at least one of: a memory address, a memory mask, or an instruction predicate.

In some examples, the populated PUBV pattern data structure represents an addressing pattern 312. In some examples, the populated PUBV pattern data structure represents a mask pattern 318. In some examples, the populated PUBV pattern data structure represents a thread control pattern 324.

Although specific parallelism efficiency architecture examples are shown in the Figures, an embodiment may depart from those examples. For instance, items shown in different Figures may be included together in an example or embodiment, items shown in a Figure may be omitted, functionality shown in different items may be combined into fewer items or into a single item, items may be renamed, or items may be connected differently to one another.

FIGS. 1 to 3 illustrate computing system 102 architectures which implicitly or explicitly include compiler actions, such as lexically analyzing source code, forming an abstract syntax tree, accessing a symbol table, or otherwise processing data. The data includes, for example, various representations or examples of program code such as source code, intermediate representations, and executable code, among other examples disclosed herein.

Figure 4:
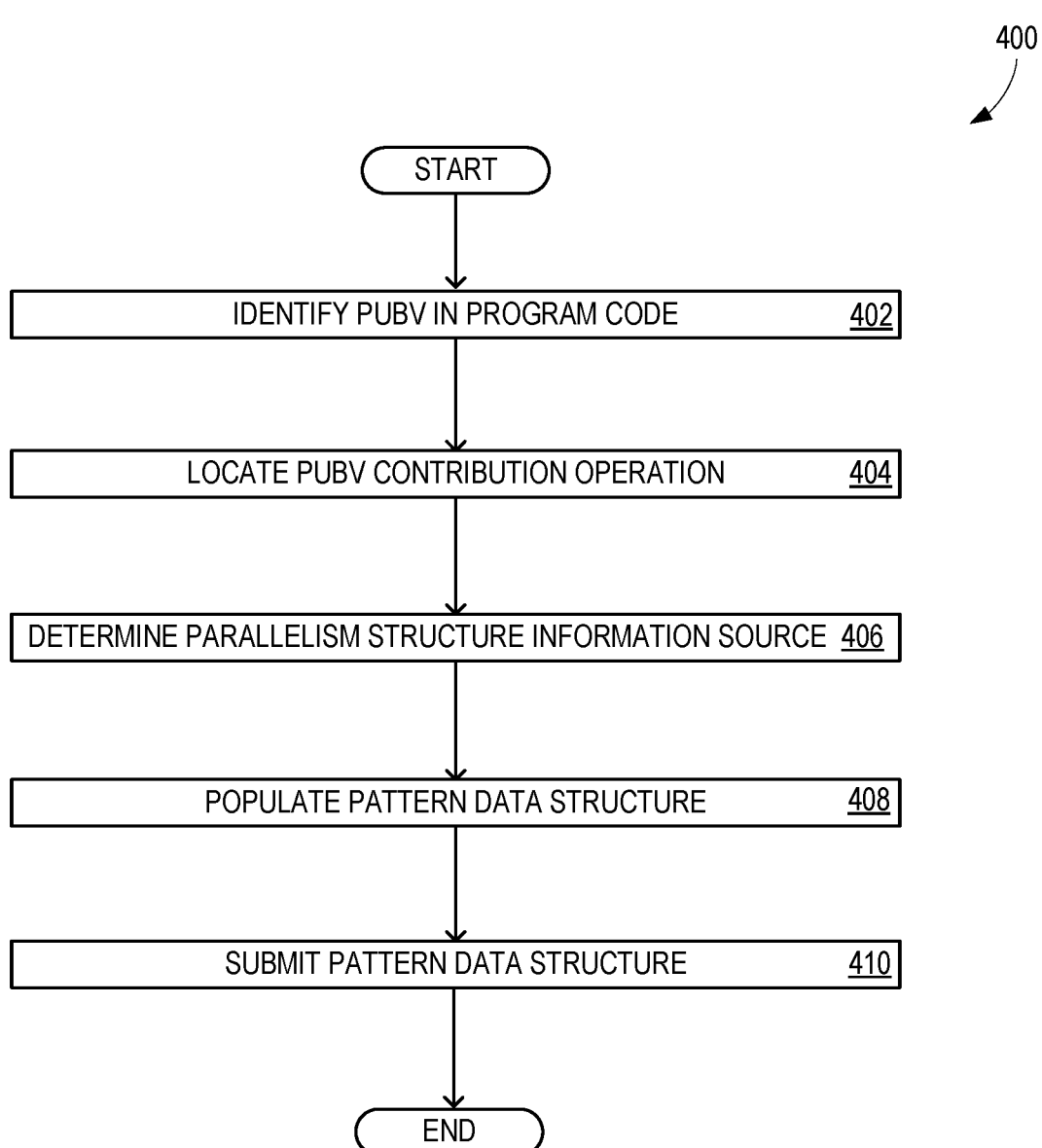
FIGS. 4-5 show flowcharts illustrating exemplary operations that may be performed when using example architectures, such as the architecture of FIG. 1.
Figure 5:
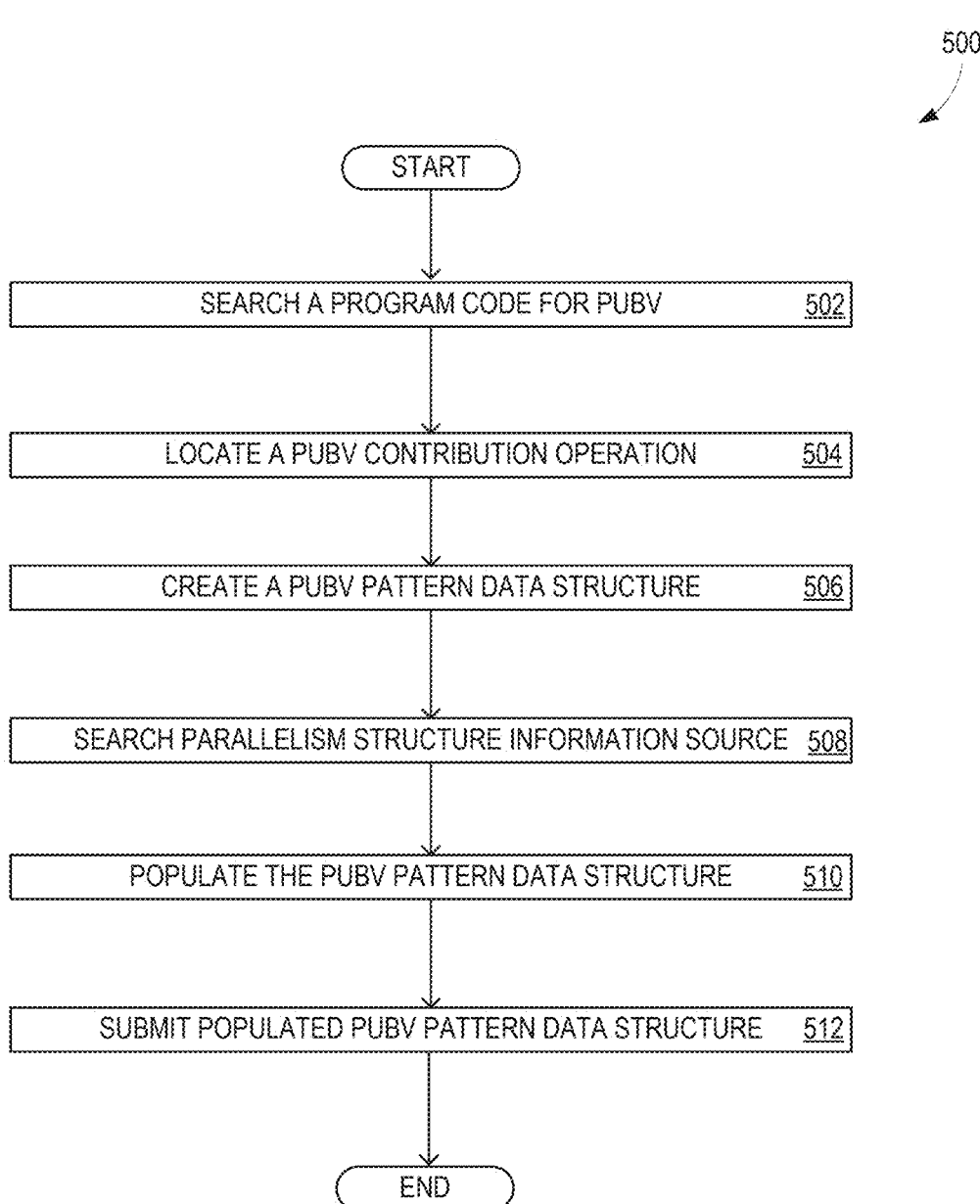

FIGS. 4 and 5 each illustrate methods 400 and 500 respectively, which are performed or assisted by some enhanced systems, such as examples of computing system 102 or another parallelism efficiency functionality enhanced system as taught herein.

Technical processes shown in the Figures or otherwise disclosed will be performed automatically, such as by the computing system 102, unless otherwise indicated. Related non-claimed processes may also be performed in part automatically and in part manually to the extent action by a human person is implicated. For example, in some situations a human user 104 types a project name or a file name into an interface 330. But no process contemplated as innovative herein is entirely manual or purely mental. That is, none of the claimed processes can be performed solely in a human mind or on paper. Any claim interpretation to the contrary is squarely at odds with the present disclosure.

In a given example, zero or more illustrated operations of a process may be repeated, perhaps with different parameters or data to operate on. Operations in an example may also be done in a different order than listed herein.

Referring to FIG. 4, the exemplary flowchart 400 includes a compiler embodiment in a computing system. The exemplary method of flowchart 400 starts at 402, where a parallelism unstructured behavior value (PUBV) is identified in a program code. The PUBV is associated with a risk of a runtime behavior which departs from a parallelism structure. At 404, a PUBV contribution operation, which contributes to the PUBV, is located in the program code. At 406, a parallelism structure information source is determined based at least in part on the PUBV contribution operation. At 408, the PUBV pattern data structure is populated based at least in part on the parallelism structure information source. At 410, the populated PUBV pattern data structure is submitted to a code generator of the compiler embodiment. In this example, the PUBV pattern data structure was previously created, so creating the PUBV pattern data structure operation is omitted, such as omitted in FIG. 4. After 410, the exemplary method of flowchart 400 ends.

Referring next to FIG. 5, the exemplary flowchart 500 includes a compiler embodiment in a computing system. The exemplary method of flowchart 500 starts at 502, where a program code is searched for a parallelism unstructured behavior value (PUBV). The PUBV is associated with a risk of a runtime behavior which departs from a parallelism structure. At 504, a PUBV contribution operation, which contributes to the PUBV, is located in the program code. At 506, a PUBV pattern data structure is created based at least in part on the PUBV contribution operation as the PUBV pattern data structure has not been created earlier. At 508, a parallelism structure information source is searched based at least in part on the PUBV contribution operation. At 510, the PUBV pattern data structure is populated based at least in part on the parallelism structure information source. At 512, the populated PUBV pattern data structure is submitted to a code generator of the compiler embodiment after which the exemplary method of flowchart 500 ends.

In some examples, the method includes identifying, in the program code, a pointer production instruction which produces a pointer that is used by a load instruction or used by a store instruction. The method further includes locating, in the program code, a dependent instruction of the pointer production instruction at least in part by traversing a program code intermediate representation. For example, the method includes traversing part of an abstract syntax tree. The method further includes populating the PUBV pattern data structure at least in part by traversing the program code intermediate representation.

In some examples, the method includes identifying, in the program code, a mask production instruction, which produces a mask that is used by a load instruction or used by a store instruction. The method further includes locating, in the program code, a dependent instruction of the mask production instruction at least in part by traversing a program code intermediate representation. For example, the method includes traversing part of an abstract syntax tree. The method further includes populating the PUBV pattern data structure at least in part by traversing the program code intermediate representation.

In some examples, the method includes performing a static analysis of the program code, such as to identify a PUBV or to locate a dependent instruction (e.g., a PUBV contribution operation), or both.

In some examples, the PUBV includes a control divergence. Note that "control divergence" refers herein to a point in the code at which control may diverge due to different threads taking different control flow branches, and also refers to the circumstance in which control diverged due to different threads taking different control flow branches.

In some examples, the method locates multiple PUBV contribution operations which collectively correspond to a vector of monotonically increasing addresses. In some examples, the method locates multiple PUBV contribution operations which collectively correspond to an array of thread identifiers. In some examples, the PUBV pattern data structure includes an offset and a stride. In some examples, the PUBV pattern data structure includes a start, an end, and a dimension.

Some examples use or provide the computer-readable storage device 112 and/or removable storage medium 114 configured with data 118 and instructions 116 which upon execution by the processor 110 cause the compiler 124 of the computing system 102 to perform operations comprising: identifying in a program code a parallelism unstructured behavior value (PUBV), the PUBV associated with a risk of a runtime behavior which reduces a parallelism efficiency; locating in the program code a PUBV contribution operation which contributes to the PUBV; creating a PUBV pattern data structure based at least in part on the PUBV contribution operation; determining a parallelism structure information source based at least in part on the PUBV contribution operation; populating the PUBV pattern data structure based at least in part on the parallelism structure information source; and submitting the populated PUBV pattern data structure to a code generator 214. In a variation, the PUBV pattern data structure was previously created, so creating the PUBV pattern data structure operation is omitted from an embodiment.

In some examples, the runtime behavior which departs from a parallelism structure includes at least one of the following: a memory access irregularity when a tensor size is not an integer multiple of a hardware vector size; a memory address irregularity when a vector of thread identifiers does not hold regularly spaced entries; or a control divergence in a SIMT program. For example, SIMT and SIMD programs are sometimes encoded to handle unstructured behavior encountered by real-world applications. Memory access is irregular when a tensor size (e.g., a 500-element tensor) cannot be divided evenly by a hardware vector size (e.g., a 128-element vector). Memory addressing in a SIMT program is irregular when address calculation and memory accesses happen independently on each thread. More generally, unstructured behavior (e.g., an irregularity) occurs when a group of control or memory access units in a parallel processor behaves without a regular pattern for the same static instruction, thereby hampering or reducing efficient execution of parallel computation.

In some examples, the program code 130 includes a source code in a high-level language (e.g., C, C++, Python, etc.). However, other forms of code may also be optimized by applying teachings herein, e.g., intermediate code, object code, assembly code, or executable code.

In some examples, the PUBV includes a thread identifier in a single instruction multiple thread program. In some examples, the PUBV includes at least one of: a memory address in a single instruction multiple data program, or a memory mask in a single instruction multiple data program. Existing SIMT and SIMD Approaches SIMT and SIMD programming models are used on many computing systems today. The SIMT programming model is adopted by many high-performance Graphic Processing Unit (GPUs), including general-purpose GPUs (GPGPUs). Notably, Nvidia® and AMDR GPUs adopt SIMT programming models (marks of their respective owners Nvidia Corporation, Advanced Micro Devices, Inc.). Many software libraries also expose SIMT programming models, e.g., CUDA® (mark of Nvidia Corporation), HIP (Heterogeneous-compute Interface for Portability), OpenCL® (mark of Apple Inc.), etc. The SIMD programming model is seen on many vector processors. Some architectures that adopt SIMD models include different flavors of x86 SSE (SSE, SEE2, SEE3, SSE4, etc.) and AVX (AVX, AVX2, AVX-512, etc.) extensions, ARM SVE and Neon extensions, and RISC-V Vector extension (marks of their respective owners). SSE stands for Streaming SIMD Extensions. AVX stands for Advanced Vector Extensions. RISC stands for reduced instruction set computer. Triton is a software library, language, and compiler that exposes SIMD programming models; it supports multi-dimensional (e.g., 2-dimensional) block data.

SIMT and SIMD programming models each expose parallelism of a program. SIMT programs describe the behavior of an individual thread, and hardware leveraged thread-level parallelism and executed multiple threads concurrently. On the other hand, SIMD programs describe behavior of multiple elements (e.g., a vector) in an operation, which sometimes get directly mapped to a hardware vector and is processed concurrently.

Many SIMT and SIMD processors only provide optimized performance when programs behave in a structured and regular manner. However, it is technically challenging to detect and leverage opportunities for such behavior, with either programming model. Specifically, even when efficient parallel behavior is expected, SIMT and SIMD programs are often encoded less efficiently to properly handle unstructured behavior that arises in real-world applications, e.g., when tensor size is not evenly divisible by hardware vector size. This way of encoding sometimes results in sub-optimal performance of such programs.

In SIMT models, programs describe the behavior of a thread operating on scalar data. On the other hand, processors or their supporting mechanisms often try to schedule a group of threads (e.g., a "warp" in Nvidia terminology) to execute together, in order to amortize hardware cost, improve utilization, and optimize performance. However, this strategy is only effective if all threads in the group behave uniformly, such as taking the same control path and accessing contiguous memory addresses. As used herein, "contiguous" means regularly spaced, for example adjacent or otherwise regularly spaced at an increment of one or some other constant interval.

Under one approach, this challenge on SIMT architectures is managed in hardware at execution time or runtime, such as by using GPU thread compaction and memory coalescing. Dedicated hardware units observe the behavior of threads at runtime, detect control or memory access patterns, and optimize an execution schedule accordingly. However, postponing this detection to runtime imposes significant overhead. Such runtime detection mechanisms consume significant silicon area and power. Latency of runtime detection also leads to large on-chip storage overhead, due in part to wide memory buses.

In SIMD models, programs describe the behavior of a vector of data, which sometimes gets mapped to a hardware vector. SIMD operations often operate on an entire hardware vector. However, challenges like those in SIMT models still exist, even though they are sometimes manifested in different ways.

SIMD models often use predicates to control the behavior of individual lanes when their behavior can differ. Without structure information of the program, one approach is to execute instructions at runtime to generate a mask, each field of which controls the behavior of each lane. This runtime approach imposes both compile time and runtime overhead related to executing related instructions and storing mask data. Programs often also contain gather-scatter instructions in order to handle memory accesses to potentially noncontiguous memory locations. This leads to similar runtime solutions and attendant problems such as those associated with memory coalescing on SIMT architectures.

Example Improvements to Existing SIMT and SIMD Approaches

Some examples as described herein provide or utilize a compile-time approach to restore structure information from SIMT and SIMD programs. In the process of mapping operations onto parallel processors, information on the structure of the operation and data layout can be lost. Reconstructing such information is often valuable as it can reveal significant performance optimization opportunities. A compile-time approach to restore such structure information 410 from SIMT and SIMD programs is described herein.

Some examples described herein utilize or provide a software-based compile-time approach to restore structure information from SIMT and SIMD programs.

Some examples reduce the overhead associated with generating runtime metadata (e.g., per-thread memory address in SIMT models, or per-lane predicate in SIMD models). This allows the examples to employ smaller and faster programs, as it eliminates the number of dynamic instructions otherwise executed at runtime and reduces register and cache pressure associated with those instructions.

Some examples reduce dependencies on expensive hardware pattern detection and scheduling mechanisms. By identifying structure information in a program, an example can replace element-wise or lane-wise operations with global operations. For instance, gather/scatter can be converted to accesses to contiguous memory addresses, and lane predication can be converted to operations on multiple contiguous lanes when applicable.

In contrast to SIMT and SIMD models natively exposing 1D control structures (e.g., warp) and data structures (e.g., vector), some examples as described herein extend support to high-dimensional structures (e.g., the model used by Triton).

In general, the teachings herein open the software-hardware codesign space for traditional SIMT and SIMD architectures.

As an overview of some examples, a compile-time approach analyzes operations that can lead to operations that have unstructured behavior at runtime, identifies the underlying patterns, and replaces per-thread or per-lane operations with global operations. In some examples, the analysis proceeds as follows:

Identify a value (e.g., PUBV) that can lead to unstructured behavior at runtime, e.g., a memory address in a SIMT program or a predicate in a SIMD program.

Parse operations that generate the corresponding value. During parsing of the operations, maintain and update a data structure to record the pattern that the operation generates, e.g., a 2D matrix of replicated constant data or a ID monotonically increasing array.

Determine a source of structured information, e.g., by capturing thread ID and block ID in SIMT models, or by generating a sequence in SIMD models with an INDEX instruction in ARM SVE or arranged in Triton.

Construct and structure information by parsing all dependent operations, inserting new instructions to calculate boundaries and sizes as appropriate. On a successful parsing, replace unstructured operations with global structured operations as appropriate.

Note that for each scenario (e.g., memory access pattern, mask generation, etc.), the implementation of this approach can be different. Software that applies this approach may implement multiple versions of the analysis above for each scenario.

Several detailed examples are discussed below. For convenience, these particular examples are numbered, with the understanding that the present disclosure also provides other examples not similarly numbered and the understanding that teachings herein are not limited to the numbered examples.

Example 1: A compiler embodiment analyzes pointer arithmetic operations for 1-dimensional data in a SIMT program. The following SIMT example is written in C-like pseudocode:

```
const size_t blockDim;
const size_t threadId;
const size_t constWidth;
const size_t constStride;
void PtrArith(float* src, float* dst) {
    size_t offset = blockDim * constWidth + threadId( ) * constStride;
    float src_value = src[offset];
    dst[offset]= abs(src_value);
}
```

Under a less optimal approach, each thread performs pointer arithmetic operations. These addresses and offsets are materialized at runtime, meaning the calculation will be repeated for each thread. SIMT processors sometimes detect at runtime that these threads access contiguous addresses, and coalesce them.

However, an example applying teachings herein parses the operations to restore the structure information of memory accesses for multiple threads. For example, when a SIMT processor schedules 32 threads to execute together, a compiler embodiment extracts the range of memory accesses for all contiguous threads, and generates code to issue a single memory access command for all threads when that is supported by the target hardware, e.g., for a TMA (Tensor Memory Accelerator) engine on an Nvidia H100 system (marks of Nvidia Corporation).

More precisely, an analysis program portion of the compiler embodiment performs steps such as the following. The analysis program identifies that src[offset], dst[offset] and any dependent intermediate values are addresses and offsets and can lead to divergence in thread behavior. The compiler embodiment parses operations that generate the corresponding value. The compiler embodiment creates the following data structure to record the addressing pattern for each memory access:

```
struct PtrPattern {
    float* source;
    size_t offset;
    size_t stride;
}
```

The compiler embodiment determines that the threadId( ) function provides the structure information. For example, when 32 threads of contiguous thread IDs are scheduled together, a vector composed of their thread IDs will be a monotonically and continuously increasing vector.

After parsing all dependent operations, the pattern data structure contains the following information for src[offset] and dst[offset]. New scalar operations are optionally added to calculate blockDim*constWidth.

```
// src[offset]
struct PtrPattern {
    float* source; // = src
    size_t offset; // = blockDim * constWidth
    size_t stride; // = constStride
}
// dst[offset]
struct PtrPattern {
    float* source; // = dst
    size_t offset; // = blockDim * constWidth
    size_t stride; // = constStride
}
```

Parsing by the compiler embodiment is successful, and the embodiment has restored structure information of the memory accesses. This result is submitted to the code generator, which uses it to issue a single coalesced memory access request, e.g., to a dedicated DMA (direct memory access) engine such as Tensor Memory Accelerator on Nvidia H100, on behalf of all threads that will be executed concurrently. For example, if threads with IDs from 0 to 31 are scheduled to run together, the code generator derives from the information above that the threads will load from memory locations: [src+blockDim*constWidth+0*constStride, src+blockDim*constWidth+constStride+1*constStride, . . . , src+blockDim*constWidth+31*constStride], and that the threads will store to memory locations: [dst+blockDim*constWidth+0*constStride, dst+blockDim*constWidth+constStride+1*constStride, . . . , dst+blockDim*constWidth+31*constStride].

For example, PUBV represents a value that can lead to unstructured behavior (e.g., the address of src[offset], which is a 1D vector of addresses). The PUBV is associated with a risk of a runtime behavior which reduces a parallelism efficiency. The risk refers to the scenarios where the parallel processor runs sub-optimally. For example, if the "structured-ness" is not extracted (either with examples of the present disclosure or using HW runtime mechanisms) to coalescing memory accesses on a SIMT processor, the memory load in Example 1 above may lead to the processor sequentially loading each element for each thread. The parallelism structure information source represents the source of "structured-ness" that PUBV depends on (e.g., threadId( )). The contribution operation represents all the operations that are involved in producing PUBV (e.g., offset=blockDim*constWidth+threadId( )*constStride; or the addition of offset and src in producing the final pointer). The PUBV pattern data structure captures the "structured-ness" of the operation (e.g., memory access, masking behavior, branch condition, etc.). The PUBV pattern data structure is represented by PtrPattern and the data structure may be different for each use case. The parallelism structure (e.g., multiple threads in a GPU SM/SIMT processor, multiple lanes of a SIMD processor) is represented by the "regular-ness" or "structured-ness" of parallel processors.

Example 2: A compiler embodiment analyzes pointer arithmetic operations for 2-dimensional data in a SIMD program. The approach described in this document and the above example generalizes to handle higher dimensional data. The following SIMD example is written in Python-like pseudocode:

```
def PtrArith2D(ptrBase, i, j, strideM, strideN, BLOCK_SIZE_M,
BLOCK_SIZE_N):
    offsetM = i * BLOCK_SIZE_M + arange(0, BLOCK_SIZE_M)
    offsetN = j * BLOCK_SIZE_N + arange(0, BLOCK_SIZE_N)
    ptrs = ptrBase + (offsetM[:, None] * strideM + offsetN[None, :] *
    strideN)
    val = load(ptrs)
    store(ptrs, abs(val))
```

In this pseudocode, the arange operation produces a range containing monotonically increasing numbers from an inclusive start value (0 in this example) to an exclusive end value (BLOCK_SIZE_M and BLOCK_SIZE_N in this example). In this pseudocode, ptrs is a 2D matrix of dimension [BLOCK_SIZE_M, BLOCK_SIZE_N] containing the addresses for each of the elements to be loaded and stored. The program calculates the offset for each row (offsetM) and each column (offsetN), broadcasts them to the shape of ptrs, performs element-wise addition to calculate an effective offset for each element, and finally element-wise adds with the base pointer ptrBase.

Taking an approach similar to Example 1, the compiler embodiment goes through the following steps. Analysis identifies as PUBVs the offsetM, offset, ptrs, and any dependent intermediate values, as addresses and offsets that can lead to divergence in thread behavior. The compiler embodiment parses operations that generate the corresponding value. The compiler embodiment creates the following data structure 308 to record the addressing pattern for each memory access:

```
template <typename DataType>
struct PtrPattern {
    DataType *source;
    size_t offset;
    size_t size[2];
    size_t stride[2];
}
```

The compiler embodiment determines that the arange( ) function provides the structure information. Analyzing arange(0,BLOCK_SIZE_M) alone will populate the data structure as shown below. Since it describes a 1D vector, the inner dimension is populated. The outer dimension is assigned dimension 1 and assigned stride "don't care" since the value is never used.

```
// arange(0, BLOCK_SIZE_M)
template <typename DataType>
struct PtrPattern {
    DataType *source;        // = nullptr
    size_t offset;           // = 0
    size_t size [2];         // = [1, BLOCK_SIZE_M]
    size_t stride[2];        // = [don't care, 1]
}
```

17 18

After parsing all dependent operations, the data structure above contains the following information for ptrs. New scalar operations may be added to compute each of these values at runtime.

```
template <typename DataType>
struct PtrPattern {
    DataType *source;          // = ptrBase
    size t offset;             // = i*BLOCK_SIZE_M*strideM +
j*BLOCK_SIZE_N*strideN
    size_t size[2];            // = [BLOCK_SIZE_M, BLOCK_SIZE_N]
    size_t stride[2];          // = [strideM, strideN]
}
```

Parsing is successful, and the compiler embodiment has restored structure information of the memory accesses. This result can be used to issue a single memory access request (e.g., to a dedicated DMA engine, such as Tensor Memory Accelerator on Nvidia H100) on behalf of all elements in the block that will be executed concurrently.

Example 3: A compiler embodiment analyzes a 2-dimensional load mask in a SIMD program. The following SIMD example is written in Python-like pseudocode:

```
def MaskedLoad(ptr, BLOCK_SIZE_M, BLOCK_SIZE_N, OFFSET_M,
OFFSET_N, M, N):
    rows = OFFSET_M + arange(0, BLOCK_SIZE_M)
    cols = OFFSET_N + arange(0, BLOCK_SIZE_N)
    mask = (rows[:, None] < M) & (cols[None, :] < N)
    x += load(ptr, mask=mask)
```

This example shows a load mask analysis for a 2D tensor. The arange operation produces a range containing monotonically increasing numbers from an inclusive start value (0 in this example) to an exclusive end value (BLOCK_SIZE_M and BLOCK_SIZE_N in this example). To generate the mask, the program broadcasts the resulting vector to create a 2D tensor, compares the broadcast result element-wise with the size of the corresponding dimension, and performs element-wise AND to create the final mask.

By analyzing the code and guiding code generation with the analysis result, materialization of the mask tensor and all the related operations can be avoided completely. The per-element predication, or per-lane predication when mapped to a ID hardware vector, is converted to a memset and a load with a precise and runtime-calculated dimension.

The analysis program (e.g., compiler 124) goes through the following steps. Analysis identifies that the mask and any dependent intermediate values are used to generate a load mask, and can lead the computation to diverge for each element of the masked load result. Analysis parses operations that generate the corresponding value. Analysis creates the following data structure to record the mask pattern. Start and end represent the inclusive start value and exclusive end value such as of a monotonically increasing or decreasing sequence, scalar is a shortcut for when the entire structure represents a single value, and dimension records the dimension from the analysis:

```
struct MaskPattern {
    size_t start;
    size_t end;
    size_t scalar;
    size_t dimension[2];
}
```

The analysis determines that the arange function provides structure information. Specifically, analyzing arange(0, BLOCK_SIZE_M) alone will populate the data structure as shown below. Since it describes 1D vector, dimension only contains one valid value.

```
// arange(0, BLOCK_SIZE_M)
struct MaskPattern {
    size_t start;              // = 0
    size_t end;                // = BLOCK_SIZE_M
```

-continued

```
    size_t scalar;             // invalid
    size_t dimension[2];       // BLOCK_SIZE_M, invalid
}
```

After parsing all dependent operations, the data structure above contains the following information:

```
// mask
struct MaskPattern {
    size_t start;                          // invalid
    size_t end;                            // invalid
    size_t scalar;                         // invalid
    size_t dimension[2];                   // min(OFFSET_M + BLOCK_SIZE_M, M),
min(OFFSET_N + BLOCK_SIZE_N, N)
}
```

New scalar operations can be inserted to calculate the new dimension precisely at runtime. After the comparison (represented by "<" s in the original program), start, end, and scalar are invalidated since they no longer contain useful information.

Parsing is successful, and the compiler embodiment has restored structure information represented by mask in the original program. An embodiment inserts instructions to calculate the precise dimensions of the data being loaded, and performs data loading without masks. Specifically, the size of the data to be loaded is:

min(OFFSET_M+BLOCK_SIZE_M,M)          Dimension 0:

min(OFFSET_N+BLOCK_SIZE_N,N)          Dimension 1:

Example 4: A compiler embodiment analysis of SIMT control divergence. As another example along the lines of the examples above, consider this code containing a thread control pattern 324:

```
const size_t blockDim;
const size_t threadId;
const size_t constWidth;
const size_t constSize;
const size_t constStride;
void PtrArith(float* src, float* dst) {
    size_t offset = blockDim * constWidth + threadId( ) * constStride;
    if (offset >= constSize)
        return;
    // perform computation...
}
```

A corresponding pattern struct looks similar to a PtrPattern, and is parsed and utilized similarly:

```
struct ControlPattern {
    size_t offset; // = blockDim * constWidth
    size_t stride; // = constStride
}
```

Some examples provide or utilize a compilation method which includes identifying a parallelism unstructured runtime behavior operation in a source code; parsing the parallelism unstructured runtime behavior operation; and based on at least a result of the parsing, replacing the parallelism unstructured runtime behavior operation with a parallelism structured runtime behavior operation.

In some examples, the parallelism structure information source is based on the PUBV contribution operation. Specifically, the source includes operations that produce inherently regular results, such as a vector of monotonically increasing offsets, or a thread ID in an array of threads.

In some examples, the PUBV pattern data structure is based on all dependent operations and not just the parallelism structure information source. For example, the structured information contained in a vector of addresses is dependent on the thread ID, but also any arithmetic operations that operate on the thread ID.

In some examples, memory address refers to a pattern of memory accesses such as in Example 2 above, and memory mask refers to a data filter such as in load mask in Example 3 above. In some examples, instruction predicate refers to predicated instructions, that is, the processor executes the instruction if and only if a predicate specified in the instruction opcode is true. If the predicate is false, the instruction is not executed. In some scenarios, a predicate can be used to implement load mask as well as control divergence, and other items such as arithmetic operations can be predicated too.

In some examples, a compiler embodiment receives SIMD or SIMT source code, parses it to derive structure information (e.g., contiguity pattern info), and uses the derived structure information to guide code generation. The resulting generated code is more efficient for parallel computation than code generated without the structure information. A code generator lacking the structure information will take a more naïve approach instead of a more efficient guided approach. The generated code uses less working memory at least by avoiding storing some intermediate results, and is smaller at least because of fewer instructions. The generated code also avoids reliance on dedicated hardware to coalesce memory accesses at runtime; access patterns are detected and leveraged at compile time instead of runtime.

In some examples, a compiler embodiment pass examines all pointer arithmetic instructions to try to populate the pattern data structure. The compiler embodiment finds the last instruction that produces a pointer used by a load or a store instruction, goes up the abstract syntax tree (AST) to track down all dependent instructions (e.g., constants, function parameters, ranges, program ids, arithmetic operations, etc.), and goes back down the AST as it populates the pattern data structure embodiment. In some variations, analysis is performed in a single pass. The compiler embodiment operates similarly for instructions that generate load masks or store masks.

Example Operating Environment

In some examples, the disclosure is operable in an embedded system such as an Internet of Things system. "IoT" or "Internet of Things" means any networked collection of addressable embedded computing or data generation or actuator nodes. An individual node is referred to as an internet of things device or IoT device or internet of things system or IoT system. Such nodes are examples of computing systems 102 as defined herein, and may include or be referred to as a "smart" device, "endpoint", "chip", "label", or "tag", for example, and IT may be referred to as a "cyber-physical system". In the phrase "embedded system" the embedding referred to is the embedding of a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

The technical character of examples described herein will be apparent to one of ordinary skill in the art, and will also be apparent in several ways to a wide range of attentive readers. Some examples address technical activities such as performing static analysis, traversing an abstract syntax tree, populating data structures, submitting data to a code generator, and compiling a program, which are each an activity deeply rooted in computing technology. Some of the technical mechanisms discussed include, for example, compilers 124, code generators 214, interfaces 330, PUBV pattern data structures, memory addresses, memory masks, control divergences, and threads. Some of the technical effects discussed include, for example, reduced size of generated code, more efficient use of parallel processing hardware, reduction or avoidance of runtime memory coalescence via dedicated hardware, and fewer memory access requests to access a given set of memory addresses. Thus, purely mental processes and activities limited to pen-and-paper are clearly excluded. Other advantages based on the technical characteristics of the teachings will also be apparent from the description provided.

One of skill in the art understands that compilation is a technical activity which cannot be performed mentally because it requires traversal and modification of computing system memory 112. This includes, for example and depending on the embodiment, traversal of compiler-internal data structures such as an abstract syntax tree, and operations such as performing static analysis, and parsing. Merely thinking about operations to manipulate data 118 in a memory 112 will not accomplish those operations. Thoughts alone, or pen-and-paper manipulations, will not accomplish timely and correct code generation. As disclosed herein, compilation also involves populating a data structure in a computing system memory 112, not on paper where the code generator has no access, and submitting the populated data structure to a code generator in a computing system memory 112 so the code generator 214 can use it in computation, which cannot be performed mentally or manually.

One of skill in the art also understands that attempting to perform compilation even in part manually or mentally would create unacceptable delays in program code creation, and would introduce a substantial risk of human errors that cause programs to crash. At some point generated code must exist in computer memory, in order for parallel processing hardware to execute that code. Humans manifestly lack the speed, accuracy, memory capacity, and specific processing capabilities that are required to perform compilation that makes generation of efficient parallel code possible as taught herein.

All of this is evident for example in the decades of technical advances in compiler technology. Those advances would be pointless, rather than being praised and pursued, if compilation was routinely done by mental processes or on paper alone. It is not, and it cannot be.

Computing system source code compilation and compilers are parts of computing technology. Hence, the parallel efficiency improvements described herein are improvements to computing technology.

Different examples provide different technical benefits or other advantages in different circumstances, and particular technical advantages follow from particular features or feature combinations, as noted at various points herein. Any generic or abstract aspects are integrated into a practical application such as an enhanced compiler 124 embodiment.

Some examples described herein address technical challenges of computer technology, and more particularly technical challenges arising in the use of parallel processing systems. Improvements in parallel processing functionality lead to improvements in the performance, accuracy, usability, security, and maintainability of software whose execution utilizes—and often depends on—the improved parallel processing functionality, which depends in turn on compilers.

Some examples described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific examples whose technical effects fully or partially solve particular technical problems, such as how to guide code generation for efficient and correct use of parallel processors, how to reduce or avoid reliance on dedicated memory coalescence hardware, how to reduce the size of SIMT or SIMD executable code, and how to move detection of parallelism pattern departures from runtime to compile time. Accordingly, vagueness, mere abstractness, lack of technical character, and accompanying proof problems are also avoided under a proper understanding of the present disclosure.

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill in the art will recognize that not every part of this disclosure, or any particular details therein, are necessarily required to satisfy legal criteria such as enablement, written description, or best mode. Also, examples are not limited to the particular scenarios, motivating examples, operating environments, tools, peripherals, software process flows, identifiers, data structures, data selections, programming languages, parallel processors, naming conventions, notations, control flows, or other implementation choices described herein. Any apparent conflict with any other patent disclosure, even from the owner of the present innovations, has no role in interpreting the claims presented in this patent disclosure.

Technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Parallelism efficiency operations such as identifying a PUBV, locating operations, creating a pattern data structure, populating a data structure, submitting a data structure to a code generator, and many other operations discussed herein (whether recited in the Figures or not), are understood to be inherently digital. A human mind cannot interface directly with a CPU or other processor, or with RAM or other digital storage, to read and write the necessary data to perform the compilation enhancement steps taught herein even in a hypothetical prototype situation, much less in an embodiment's real world large computing environment. This would all be well understood by persons of skill in the art in view of the present disclosure.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein. Similarly, the phrase "one or more of the following: A, B, and C" means "at least one of A and/or at least one of B and/or at least one of C."

This disclosure discusses various data values and data structures, which reside in a memory (RAM, disk, etc.), thereby configuring the memory. This disclosure also discusses various algorithmic steps which are to be embodied in executable code in a given implementation, and such code also resides in memory and effectively configures any general-purpose processor which executes it, thereby transforming it from a general-purpose processor to a special-purpose processor which is functionally special-purpose hardware.

Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as compiling, creating, determining, executing, generating, identifying, locating, parsing, populating, submitting, traversing (and compiles, compiled, creates, created, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The terms "embodiment" and "example" are not interchangeable with "the invention". Examples may freely share or borrow aspects to create other examples (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Although particular examples are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure examples which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Additional Examples

In some examples, a compiler embodiment analyzes source code of a program that targets a parallel processing system. The compiler embodiment identifies parallelism unstructured behavior values that potentially inhibit parallelism efficiency. Example parallelism unstructured behavior values include particular memory addresses, memory masks, control divergences, and instruction predicates, which are identified according to their context and use in the program. The compiler embodiment also locates program operations that contribute to these values, determines a source of parallelism structure information in the program, and populates a pattern data structure which is submissible to help guide code generation. Patterns detected include addressing patterns, mask patterns, and thread control patterns. Programs analyzed include single instruction multiple data programs and single instruction multiple thread programs. Code generation which is guided by the pattern data structure to optimize parallelism efficiency produces smaller and faster program code which consumes less on-chip memory.

An example computer-implemented method comprises: identifying, in a program code, a parallelism unstructured behavior value (PUBV), the PUBV associated with a risk of a runtime behavior which departs from a parallelism structure; locating, in the program code, a PUBV contribution operation which contributes to the PUBV; determining a parallelism structure information source based at least in part on the PUBV contribution operation; populating a PUBV pattern data structure based at least in part on the parallelism structure information source; and submitting the populated PUBV pattern data structure to a code generator.

An example system comprises: a digital memory; a processor in operable communication with the digital memory; and a parallelism efficiency tool, wherein the parallelism efficiency tool, upon execution by the processor, is configured to: search a program code for a parallelism unstructured behavior value (PUBV) which is associated with a risk of a runtime behavior which departs from a parallelism structure; upon identifying the PUBV, locate, in the program code, a PUBV contribution operation which contributes to the PUBV; create a PUBV pattern data structure based at least in part on the PUBV contribution operation; search in the program code for a parallelism structure information source based at least in part on the PUBV contribution operation; upon determining the parallelism structure information source, populate the PUBV pattern data structure based at least in part on the parallelism structure information source; and submit the populated PUBV pattern data structure to a code generator or report a search result of searching for at least one of the PUBV, the PUBV contribution operation, or the parallelism structure information source, or both submit the populated PUBV pattern data structure to the code generator and report the search result.

A computer-readable storage device is configured with data and instructions which upon execution by a processor cause a computing system to perform a method, the method comprising: identifying, in a program code, a parallelism unstructured behavior value (PUBV), the PUBV associated with a risk of a runtime behavior which reduces a parallelism efficiency; locating, in the program code, a PUBV contribution operation which contributes to the PUBV; determining a parallelism structure information source based at least in part on the PUBV contribution operation; populating a PUBV pattern data structure based at least in part on the parallelism structure information source; and submitting the populated PUBV pattern data structure to a code generator.

Alternatively, or in addition to the other examples described herein, examples include any combination of the following:

identifying, in the program code, a pointer production instruction which produces a pointer that is used by a load instruction or used by a store instruction;

locating, in the program code, a dependent instruction of the pointer production instruction at least in part by traversing a program code intermediate representation;

populating the PUBV pattern data structure at least in part by traversing the program code intermediate representation;

identifying, in the program code, a mask production instruction which produces a mask that is used by a load instruction or used by a store instruction;

locating, in the program code, a dependent instruction of the mask production instruction at least in part by traversing a program code intermediate representation;

populating the PUBV pattern data structure at least in part by traversing the program code intermediate representation;

the method comprises performing a static analysis of the program code;

the PUBV includes a control divergence;

the method locates multiple PUBV contribution operations which collectively correspond to a vector of monotonically increasing addresses;

the method locates multiple PUBV contribution operations which collectively correspond to an array of thread identifiers;

the PUBV pattern data structure comprises an offset and a stride;

the PUBV pattern data structure comprises a start, an end, and a dimension;

the program code comprises program code of a single instruction multiple thread program, and the parallelism unstructured behavior value comprises at least one of: a memory address, a memory mask, or a control divergence;

the program code comprises program code of a single instruction multiple data program, and the parallelism unstructured behavior value comprises at least one of: a memory address, a memory mask, or an instruction predicate;

the populated PUBV pattern data structure represents an addressing pattern;

the populated PUBV pattern data structure represents a mask pattern;

the populated PUBV pattern data structure represents a thread control pattern;

the runtime behavior which departs from a parallelism structure comprises at least one of the following:

a memory access irregularity when a tensor size is not an integer multiple of a hardware vector size;

a memory address irregularity when a vector of thread identifiers does not hold regularly spaced entries; or a control divergence in a single instruction multiple thread program;

the program code is a source code in a high-level language;

the PUBV comprises a thread identifier in a single instruction multiple thread program;

the PUBV comprises at least one of: a memory address in a single instruction multiple data program, or a memory mask in a single instruction multiple data program While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising." "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:
identifying, by a compiler, a parallelism unstructured behavior value (PUBV) in a program code comprising a single instruction multiple thread (SIMT) program or a single instruction multiple data (SIMD) program, the PUBV associated with a risk of a runtime behavior which departs from a parallelism structure;
locating, by the compiler, a PUBV contribution operation in the program code that contributes to the PUBV;
creating, by the compiler, a PUBV pattern data structure based at least in part on the PUBV contribution operation, the PUBV pattern data structure including at least one of: an offset and stride representing an addressing pattern, a start, end, and dimension representing a mask pattern, or a thread control pattern representing a control divergence;
determining, by the compiler, a parallelism structure information source based at least in part on the PUBV contribution operation;
submitting, by the compiler, the PUBV pattern data structure to a code generator of the compiler, the PUBV pattern data structure being populated by the compiler based on the parallelism structure information source; and
generating, by the code generator, executable parallel computing code using the PUBV pattern data structure.

2. The computer-implemented method of claim 1, wherein the created PUBV pattern data structure represents an addressing pattern or a mask pattern.

3. The computer-implemented method of claim 1, wherein the method comprises:
identifying, in the program code, a pointer production instruction which produces a pointer that is used by a load instruction or used by a store instruction;
locating, in the program code, a dependent instruction of the pointer production instruction at least in part by traversing a program code intermediate representation; and
populating the PUBV pattern data structure at least in part by traversing the program code intermediate representation.

4. The computer-implemented method of claim 1, wherein the method comprises:
identifying, in the program code, a mask production instruction which produces a mask that is used by a load instruction or used by a store instruction;

locating, in the program code, a dependent instruction of the mask production instruction at least in part by traversing a program code intermediate representation; and
populating the PUBV pattern data structure at least in part by traversing the program code intermediate representation.

5. The computer-implemented method of claim 1, wherein the method comprises:
identifying, in the program code, a value that leads to control divergence;
locating, in the program code, a dependent instruction that produces the value that leads to control divergence by traversing a program code intermediate representation; and
populating the PUBV pattern data structure at least in part by traversing the program code intermediate representation.

6. The computer-implemented method of claim 1, wherein the method locates multiple PUBV contribution operations which collectively correspond to a vector of monotonically increasing addresses.

7. The computer-implemented method of claim 1, wherein the method locates multiple PUBV contribution operations which collectively correspond to an array of thread identifiers.

8. The computer-implemented method of claim 1, wherein the PUBV pattern data structure comprises an offset and a stride.

9. The computer-implemented method of claim 1, wherein the PUBV pattern data structure comprises a start, an end, and a dimension.

10. A computing system comprising:
a digital memory;
a processor in operable communication with the digital memory; and
a parallelism efficiency tool, wherein the parallelism efficiency tool, upon execution by the processor, is configured to:
search a program code including a single instruction multiple thread (SIMT) program or a single instruction multiple data (SIMD) program for a parallelism unstructured behavior value (PUBV) which is associated with a risk of a runtime behavior which departs from a parallelism structure;
create a PUBV pattern data structure based on a PUBV contribution operation, wherein the PUBV contribution operation which contributes to the PUBV is located in the SIMT program or the SIMD program, the PUBV pattern data structure including at least one of: an offset and stride representing an addressing pattern, a start, end, and dimension representing a mask pattern, or a thread control pattern representing a control divergence;
populate the PUBV pattern data structure based on a parallelism structure information source, wherein the parallelism structure information source is searched in the SIMT program or the SIMD program based on the PUBV contribution operation;
submit the populated PUBV pattern data structure to a code generator; and
cause the code generator to generate executable parallel computing code using the populated PUBV pattern data structure.

11. The computing system of claim 10, wherein the program code comprises program code of the SIMT program, and the PUBV comprises at least one of: a memory address, a memory mask, or a control divergence.

12. The computing system of claim 10, wherein the program code comprises program code of the SIMD program, and the PUBV comprises at least one of:

a memory address, a memory mask, or an instruction predicate.

13. The computing system of claim 10, wherein the populated PUBV pattern data structure represents an addressing pattern or a mask pattern.

14. The computing system of claim 10, wherein the parallelism efficiency tool performs a static analysis of the program code and/or performs compiling.

15. The computing system of claim 10, wherein the populated PUBV pattern data structure represents a thread control pattern.

16. A computer-readable storage device configured with data and instructions which upon execution by a processor cause a computing system to perform a method, the method comprising:

identifying, by a compiler, a parallelism unstructured behavior value (PUBV) in a program code comprising a single instruction multiple thread (SIMT) program or a single instruction multiple data (SIMD) program, the PUBV associated with a risk of a runtime behavior which reduces a parallelism efficiency;

locating, by the compiler, a PUBV contribution operation in the program code that contributes to the PUBV;

creating, by the compiler, a PUBV pattern data structure based at least in part on the PUBV contribution operation, the PUBV pattern data structure including at least one of: an offset and stride representing an addressing pattern, a start, end, and dimension representing a mask pattern, or a thread control pattern representing a control divergence;

determining, by the compiler, a parallelism structure information source based at least in part on the PUBV contribution operation;

submitting, by the compiler, the PUBV pattern data structure to a code generator of the compiler, the PUBV pattern data structure being populated by the compiler based on the parallelism structure information source; and generating, by the code generator, executable parallel computing code using the PUBV pattern data structure.

17. The computer-readable storage device of claim 16, the PUBV being associated with a risk of a runtime behavior which reduces a parallelism efficiency, wherein the runtime behavior which departs from a parallelism structure comprises at least one of the following:

a memory access irregularity when a tensor size is not an integer multiple of a hardware vector size;

a memory address irregularity when a vector of thread identifiers does not hold regularly spaced entries; or a control divergence in the SIMT program.

18. The computer-readable storage device of claim 16, wherein the program code is a source code in a high-level language.

19. The computer-readable storage device of claim 16, wherein the PUBV comprises a thread identifier in the SIMT program.

20. The computer-readable storage device of claim 16, wherein the PUBV comprises at least one of: a memory address in a single instruction multiple data program, or a memory mask in the SIMD program.

*     *     *     *     *